United States Patent
Yoon

Patent Number: 5,981,939
Date of Patent: Nov. 9, 1999

[54] DEVICE FOR SENSING SUDDEN STOP OF MACHINE

[75] Inventor: Mu-Young Yoon, Seoul, Rep. of Korea

[73] Assignee: Joongwoo Electronic Co., Ltd., Pucheon, Rep. of Korea

[21] Appl. No.: 08/946,566

[22] Filed: Oct. 7, 1997

[30] Foreign Application Priority Data

Apr. 21, 1997 [KR] Rep. of Korea .................. 97-8355

[51] Int. Cl.$^6$ .............. G01D 5/34; G01B 11/00; B60Q 1/44
[52] U.S. Cl. ............ 250/229; 250/222.1; 250/231.1; 340/467
[58] Field of Search ........................ 250/229, 231.1, 250/231.19, 221, 222.1; 340/467, 468, 479, 436, 438

[56] References Cited

U.S. PATENT DOCUMENTS

| | | |
|---|---|---|
| 3,760,353 | 9/1973 | Hassinger . |
| 5,115,186 | 5/1992 | Reinartz et al. ............... 250/229 |
| 5,404,130 | 4/1995 | Lee et al. ...................... 340/479 |
| 5,434,554 | 7/1995 | Caesar ......................... 340/468 |
| 5,442,333 | 8/1995 | Bailey ......................... 340/467 |
| 5,669,147 | 9/1997 | Nakajima et al. . |
| 5,677,670 | 10/1997 | Gangloff . |
| 5,796,097 | 8/1998 | Lawrence ...................... 250/229 |

*Primary Examiner*—Edward P. Westin
*Assistant Examiner*—John R Lee
*Attorney, Agent, or Firm*—Jacobson, Price, Holman & Stern, PLLC

[57] ABSTRACT

A device for sensing a sudden stop of a machine is disclosed. A spring-biased weight wheel is selectively moved in response to a predetermined extent of inertia force. A beam shutter is connected to the weight wheel and is selectively inserted into an optical sensor, thus intercepting a light beam of the sensor and allowing the sensor to generate a sudden stop signal. The spring force for the weight wheel is adjustable by controlling the position of a movable support plate and so the sensitivity of the device is controllable. The device is only started in response to the predetermined extent of inertial force, thus being almost completely prevented from being unexpectedly started by normal operational vibrations or rotating motions of the machine.

4 Claims, 4 Drawing Sheets

DEVICE FOR SENSING SUDDEN STOP OF MACHINE

BACKGROUND OF THE INVENTION

1. Field of the Invention

The present invention relates, in general, to a device for sensing a sudden stop of a machine such as a car or an industrial robot and, more particularly, to a sudden stop sensing device capable of quickly and precisely sensing a sudden stop of a car or an actuating arm of an industrial robot and outputting an electric signal informing a driver or an operator of such a sudden stop.

2. Description of the Prior Art

As well known to those skilled in the art, several types of devices for sensing a sudden stop of machines such as cars or industrial robots are proposed and practically used.

A known sudden stop sensing device for machines is shown in FIG. 1A. The known sensing device of FIG. 1A is comprised of a sealed tank 101 which is almost half filled with mercury 102. Two electrodes are set on one side wall of the tank 101 in such a manner that one electrode 103 is positioned under the horizontal normal level of the mercury 102, thus being always immersed in the mercury 102, and the other electrode 103' is positioned above the normal level of the mercury 102, thus being not immersed in the mercury 102. In the event of a sudden stop of a car or an industrial robot, the mercury 102 inertially leans to one side, thus causing the mercury level to be inclined and bringing the two electrodes 103 and 103' into a conductive state as shown by the phantom line of FIG. 1. When the two electrodes 103 and 103' are brought into such a conductive state as described above, an electric current flows in the sensing device, thus causing the device to generate a sudden stop signal.

FIG. 1B shows the construction of a known sudden stop sensing device for machines such as cars or industrial robots in accordance with another embodiment. The sensing device of FIG. 1B is comprised of a sealed tank which is provided with a slope therein. Two electrodes 103 and 103' are set on the side wall of the tank at a position around the highest edge of the slope, while a steel ball 104 is movably laid on the slope. The ball 104 normally rests on the lowermost edge of the slope by its own weight. However, in the event of a sudden stop of a car or a robot, the ball 104 inertially rolls on the slope, thus reaching the highest edge of the slope and coming into common contact with the two electrodes 103 and 103'. In such a case, an electric current flows in the sensing device and generates a sudden stop signal.

However, the above sudden stop sensing devices have the following problems. First, the sensitivity of the devices cannot be adjusted in accordance with the use of the devices. Second, it is almost impossible to give an operational deflection to the sensing devices. In addition, the sensing devices may be unexpectedly operated by normal operational vibrations or rotating motions of machines, thus having a reduced operational reliability.

Particularly, the sensing device with mercury may cause environmental pollution and may result in a serious hygienic problem for users. Another problem experienced in the known sensing devices is that it is impossible to measure the extent of a sudden stop.

SUMMARY OF THE INVENTION

Accordingly, the present invention has been made keeping in mind the above problems occurring in the prior art, and an object of the present invention is to provide a sudden stop sensing device for machines such as cars or industrial robots, which is capable of quickly and precisely sensing a sudden stop of such a machine prior to generating an electric signal informing a driver or an operator of such a sudden stop when a predetermined extent of inertia force acts on the device in a predetermined direction.

In order to accomplish the above object, the sudden stop sensing device of this invention comprises: a weight wheel normally biased to one direction and selectively moved to the other direction with a predetermined extent of inertia force acting thereon; a beam shutter selectively moved by the weight wheel; an optical sensor cooperating with the beam shutter in order to selectively generate a signal indicative of a sudden stop, with the shutter being selectively moved into the sensor by the weight wheel so as to intercept a light beam of the sensor; means for biasing the weight wheel, thus allowing the weight wheel to be moved only in the event of the predetermined extent of inertia force acting on the weight wheel; and a support plate adapted for supporting the biasing means while allowing the spring force of the biasing means to be selectively adjustable.

In the operation of the above device, the optical sensor precisely generates a signal indicative of a sudden stop when an inertia force of not less than the predetermined extent is applied onto the spring-biased weight wheel due to a sudden stop of the machine. The predetermined extent of inertia force, which starts the device, can be adjustable by controlling the spring force of the biasing means, thus allowing a user to easily control the sensitivity of the sensing device in accordance with the use of the device. The device is only started when the predetermined extent of inertial force acts on the weight wheel in a predetermined direction, thus being almost completely prevented from being unexpectedly started by a force caused by normal operational vibrations or rotating motions of the machine. Therefore, the device remarkably improves the operational reliability.

In the device of this invention, the beam shutter is provided with at least one rectangular or triangular opening for measuring the extent of inertia force acting on the weight wheel, thus improving the functional effect of the sensing device. In addition, the device is completely free from any harmful material such as mercury and so it does not cause any environmental pollution.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1A:
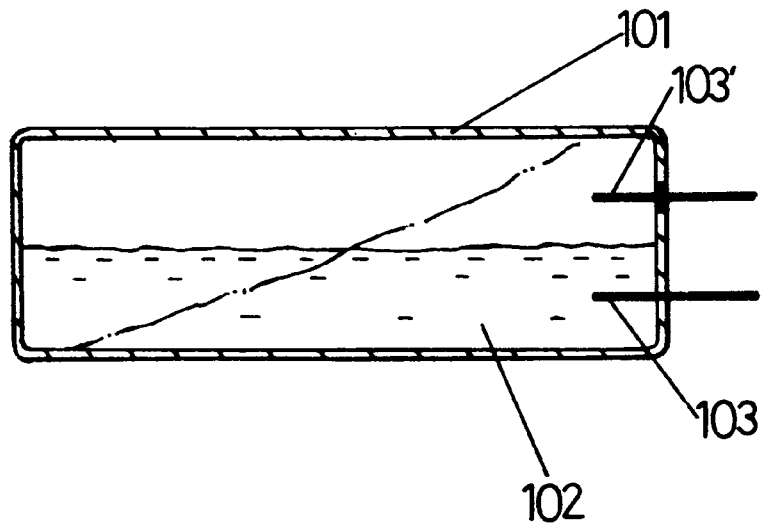
FIGS. 1A and 1B are sectional views, individually showing the construction and operation of a known sudden stop sensing device.
Figure 1B:
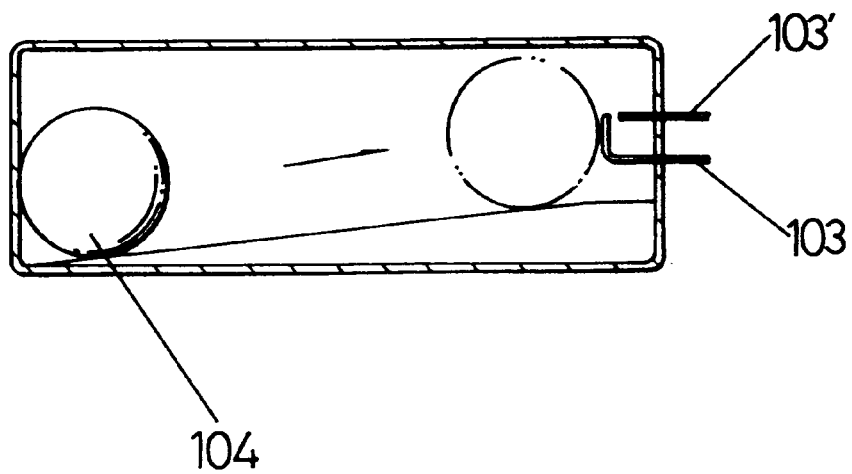
Figure 2:
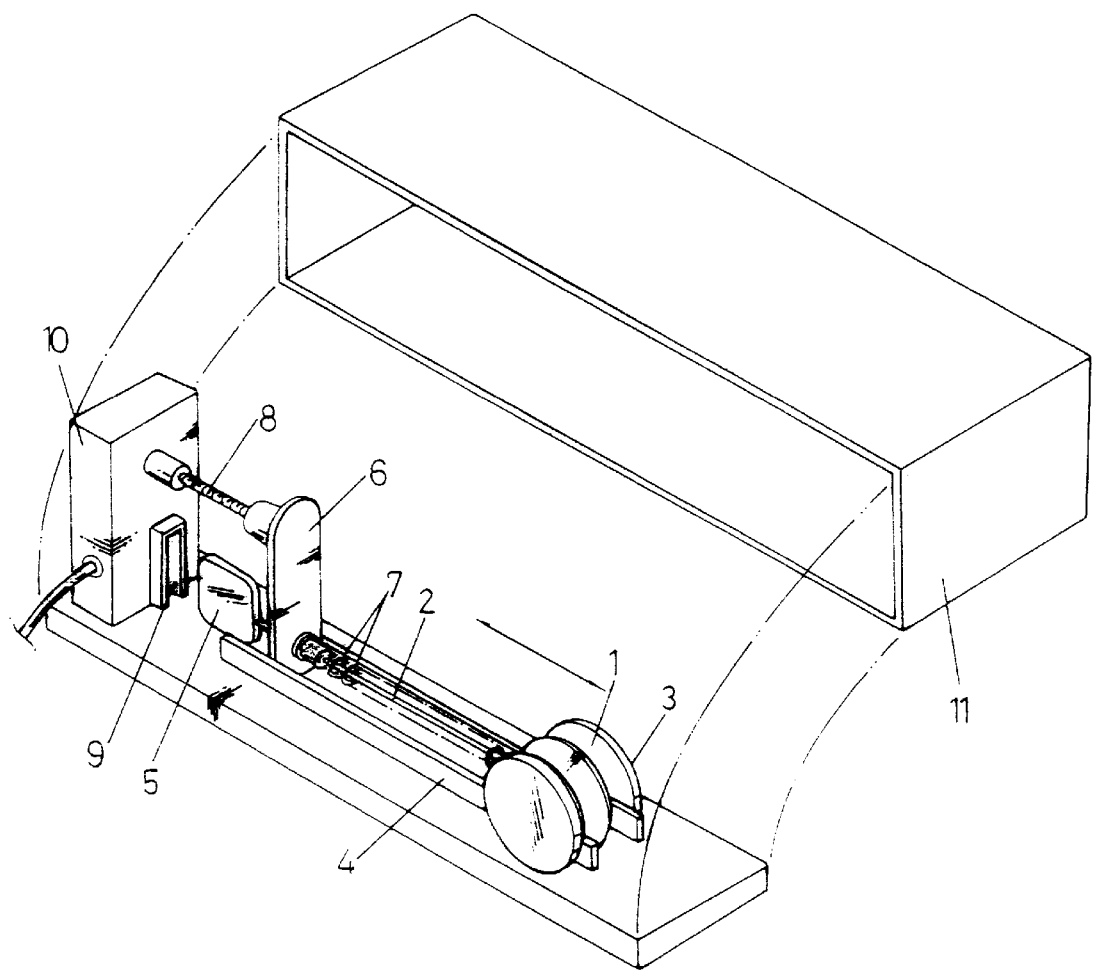
FIG. 2 is an exploded perspective view showing the construction of a sudden stop sensing device in accordance with the primary embodiment of the present invention.

FIG. 2 is an exploded perspective view showing the construction of a sudden stop sensing device for machines such as cars or industrial robots in accordance with the primary embodiment of the present invention. As shown in the drawing, the sensing device of this invention is comprised of a rotatable weight wheel 3, with a connection rod 2 horizontally extending from the wheel 3 on a base. The weight wheel 3 is circularly grooved on its rim, thus forming a grooved rim 1. A guide rail 4 is horizontally arranged on the base and rotatably carries the weight wheel 3, with the grooved rim 1 of the wheel 3 being brought into rotatable engagement with the rail 4. The guide rail 4 thus guides an inertial movement of the wheel 3 in the event of a sudden stop of a machine. Fixed to the outside end of the connection rod 2 at a position opposite to the weight wheel 3 is a beam shutter 5. A compression coil spring 7 is fitted over the connection rod 2, with both ends of the spring 7 being stopped by both the wheel 3 and a support plate 6. The sensing device also includes a knobbed screw 8, which is used for selectively adjusting the position of the support plate 6 on the base. An optical sensor 10 is arranged on the base at a position around the beam shutter 5. The optical sensor 10 is provided with a vertical slit 9, through which the shutter 5 is selectively inserted into the sensor 10 in response to an inertial movement of the wheel 3 in the event of a sudden stop of the machine. The sensing device with the above-mentioned elements is covered with a top cover 11.

The above sensing device is preferable used with a car or an actuating arm of an industrial robot. When the car or the actuating arm is suddenly stopped, an inertia force acts on the weight wheel 3.

Unlike a force caused by normal operational vibrations or rotating motions, such an inertia force acts on the wheel 3 in the same direction as the operating direction of the car or the actuating arm. Therefore, the weight wheel 3 rolls on the guide rail 4 in a direction to the optical sensor 10 while compressing the spring 7 in response to the inertia force.

Figure 3A:
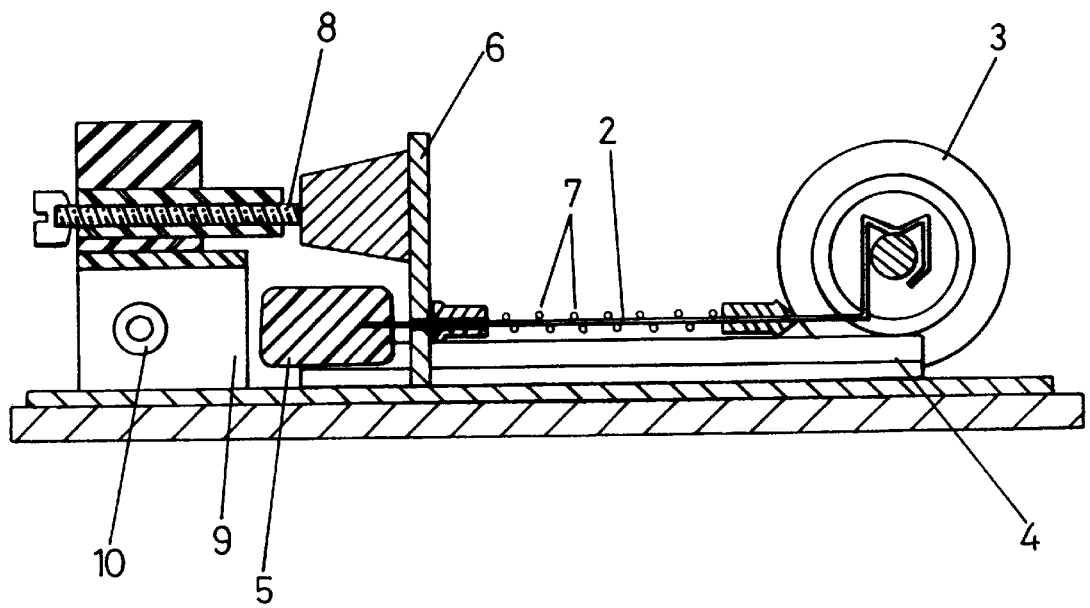
FIGS. 3A and 3B are sectional views showing the operation of the sensing device of this invention.
Figure 3B:
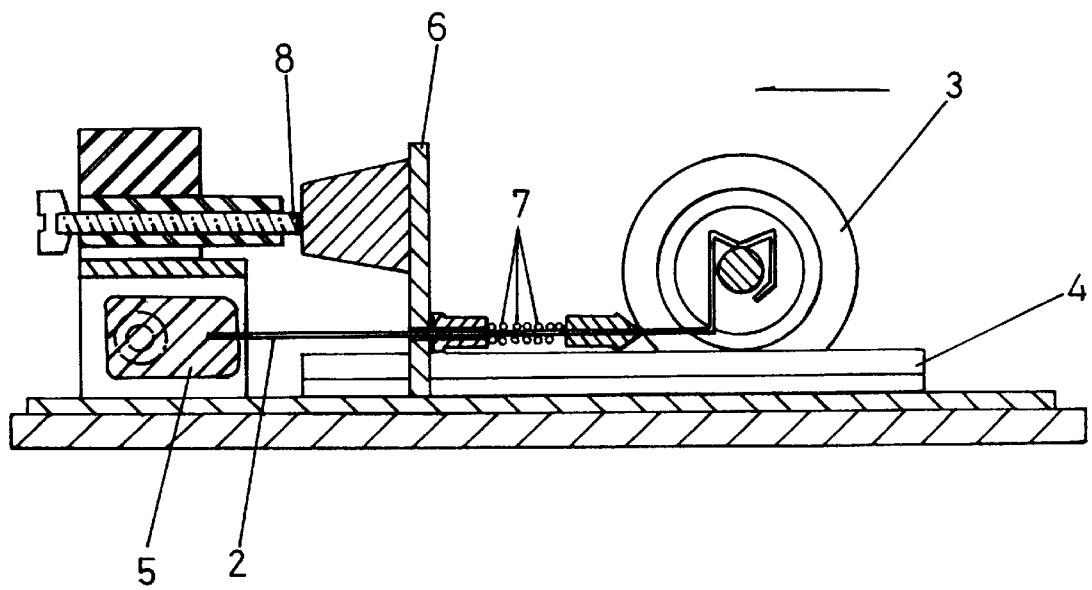

The beam shutter 5 of the connection rod 2 thus moves from the position of FIG. 3A into the slit 9 of the optical sensor 10 as shown in FIG. 3B. The shutter 5 in the slit 9 of the sensor 10 completely intercepts a light beam, which is always radiated from a light emit part of the sensor 10 onto a light receiving part.

When the light beam of the sensor 10 is intercepted by the shutter 5 as described above, the signal output from the sensor 10 is changed from a normal signal into an abnormal signal. When such a sudden stop occurs in a car, the abnormal signal from the sensor 10 causes the brake lamps on the rear end of the car to make a quick flicker, thus allowing the driver of a car to the rear to know of the sudden stop of the car travelling in advance of his car prior to appropriately meeting such a sudden stop.

Meanwhile, when such a sudden stop occurs in an actuating arm of an industrial robot, the abnormal signal from the sensor 10 represents the arm coming into unexpected contact with an obstacle. In such a case, the operator stops the operation of the robot and prevents further damage of the robot.

As described above, in the event of a sudden stop, the weight wheel 3 moves in the same direction as the operating direction of a machine. Therefore, the device of this invention is almost completely free from being unexpectedly operated by a force caused by vibrations or rotating motions of the machine in place of an inertia force, thus improving the operational reliability while sensing a sudden stop.

When a machine such as a car or an actuating arm of a robot is completely stopped or is normally operated, the inertia force acting on the weight wheel 3 is too weak to continuously compress the compression coil spring 7, thus allowing the spring 7 to elastically return the weight wheel 3 to its original position as shown in FIG. 3A.

In the sensing device of this invention, the support plate 6 is movable to the left or to the right by rotating the knobbed screw 8 in an appropriate direction, thus adjusting the spring force of the compression coil spring 7 and adjusting the inertial moving range of the weight wheel 3 as desired. That is, the knobbed screw 8 adjusts the sensitivity of the sudden stop sensing device.

Figure 4A:
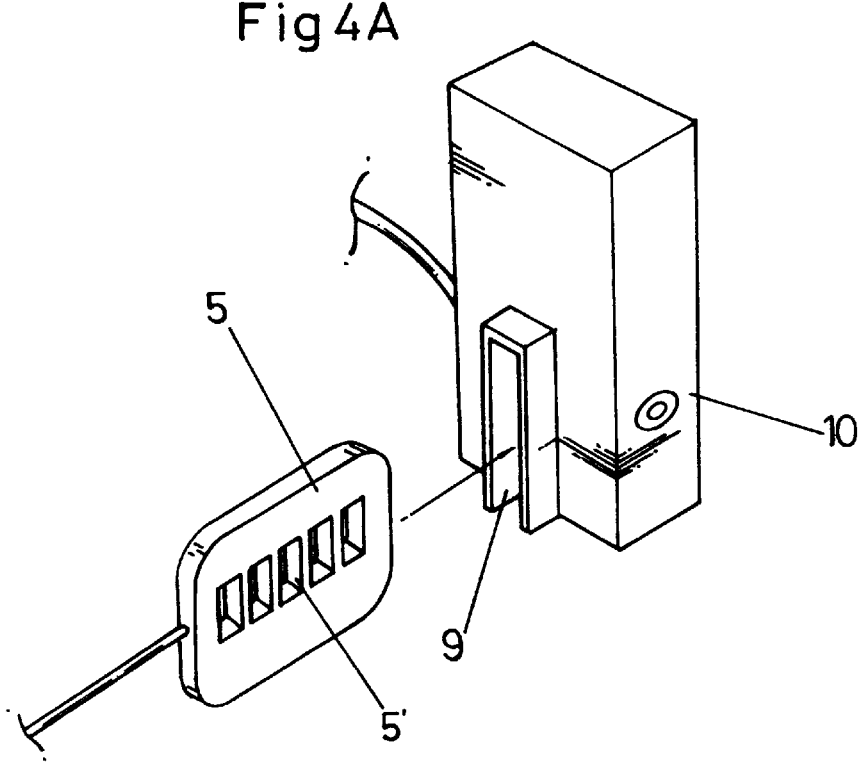
FIGS. 4A and 4B are perspective views, individually showing the configuration of a beam shutter according to the other embodiment of the present invention.
Figure 4B:
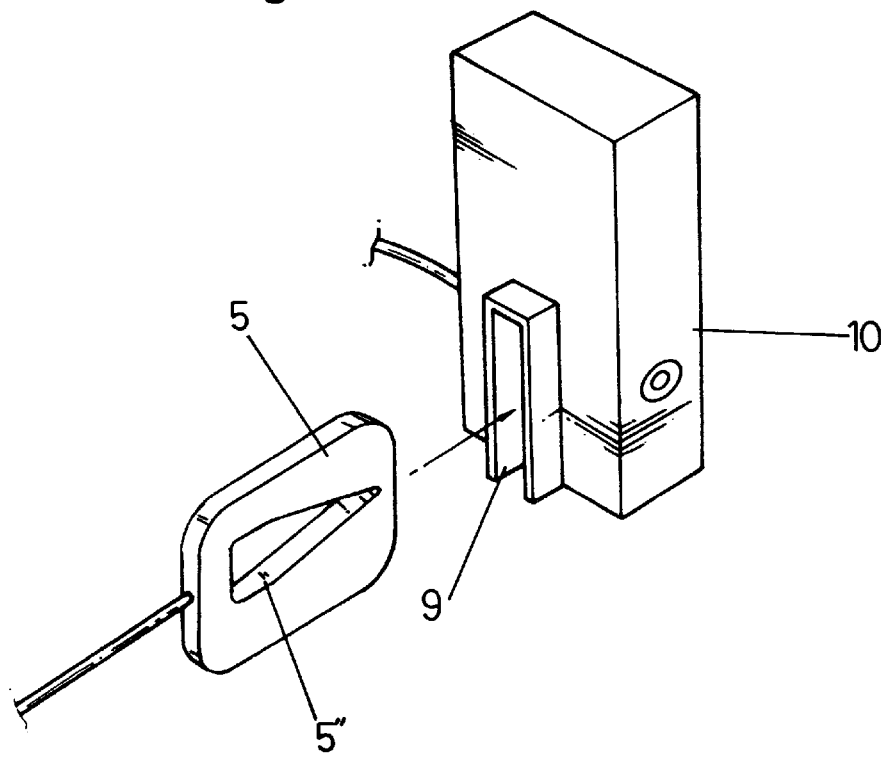

As shown in FIGS. 4A and 4B, the beam shutter 5 of this invention may be provided with at least one rectangular or circular opening 5', 5". The opening 5', 5" of the shutter 5 changes the output signal of the optical sensor 10 in accordance with a depth of the shutter 5 inserted into the slit 9 of the sensor 10, thus allowing the driver or operator to be more effectively informed of the extent of a sudden stop.

That is, when the shutter 5 is provided with a plurality of regularly-spaced rectangular openings 5' as shown in FIG. 4A, the light beam, which is emitted from the light emit part onto the light receiving part of the sensor 10, is intermittently intercepted by the shutter 5 as the shutter 5 is inserted into the slit 9 of the sensor 10. In such a case, the depth of the shutter 5 in the slit 9 is changed in accordance with the extent of an inertia force acting on the weight wheel 3 and so the number of intermittent interceptions of the light beam by the shutter 5 is changed in accordance with the extent of the inertia force. Such a number of intermittent interceptions of the light beam is represented by the number of pulses generated from the light receiving part of the sensor 10.

In the sudden stop sensing device of this invention used with a car, the number of pulses from the light receiving part of the sensor 10 may be counted by, for example, a microprocessor prior to controlling the flickering speed of the brake lamps of the car, thus allowing drivers in the other cars around the car to be more effectively informed of the sudden stop. In the event of an actuating arm of a robot, such a number of pulses allows the operator to appropriately control the operation of the robot.

Meanwhile, FIG. 4B shows a shutter 5 with a triangular opening 5". In the event of the shutter 5 with such a triangular opening 5", the quantity of light received by the light receiving part is gradually increased as the shutter 5 is inserted into the slit 9 of the sensor 10. That is, the quantity of light received by the light receiving part is increased in proportion to the extent of the inertia force acting on the weight wheel 3. In the sudden stop sensing device of this invention used with a car, such a change in an analog value caused by the variable quantity of the received light may be checked by, for example, a microprocessor prior to controlling the flickering speed of the brake lamps of the car, thus allowing people in the other cars around the car of the sudden stop. In the event of an actuating arm of a robot, such a change in the analog value allows the operator to appropriately control the operation of the robot.

As described above, the present invention provides a sudden stop sensing device for machines such as cars or industrial robots. The device exclusively outputs a signal indicative of a sudden stop of a machine when a predetermined extent of inertia force caused by the stop acts on the device, thus being almost completely prevented from being unexpectedly operated by a force caused by vibrations or rotating motions of the machine in place of an inertia force. The device thus improves the operational reliability while sensing a sudden stop of a machine. In addition, the inertial moving range of a spring-biased weight wheel in the device is controlled by rotating a knobbed screw in an appropriate direction, thus easily and precisely controlling the sensitivity of the device while sensing a sudden stop of a machine.

Another advantage of the device of this invention resides in that the device effectively measures the extent of an inertia force acting thereon in the event of a sudden stop, thus effectively providing precise sensors with high functions. The device also has a simple construction and a high durability, and is produced at low cost, thus being effectively and practically used. The device is completely free from any harmful material such as mercury and so it does not cause any environmental pollution.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for sensing a sudden stop of a machine, comprising:

a weight wheel normally biased to one direction and selectively moved to the other direction with a predetermined extent of inertia force acting thereon;

a beam shutter selectively moved by the weight wheel;

an optical sensor cooperating with said beam shutter in order to selectively generate a signal indicative of a sudden stop, with the shutter being selectively moved into said sensor by the weight wheel so as to intercept a light beam of the sensor;

means for biasing the weight wheel, thus allowing the weight wheel to be moved only in the event of the predetermined extent of inertia force acting on the weight wheel; and a support plate adapted for supporting the biasing means while allowing the spring force of said biasing means to be selectively adjustable.

2. The sensing device according to claim 1, wherein said weight wheel has both a grooved rim and a connection rod, and is movably carried on a guide rail with the grooved rim of the weight wheel engaging with the rail, thus being moved under the guide of said guide rail.

3. The sensing device according to claim 2, wherein said connection rod connects the beam shutter to the weight wheel, with the biasing means being fitted over the connection rod and being stopped by both the support plate and the weight wheel at its both ends, and the position of said support plate is adjustable by a screw.

4. The sensing device according to claim 1, wherein said beam shutter is provided with at least one opening for measuring the extent of inertia force acting on the weight wheel.

* * * * *